(12) United States Patent
Horesh

(10) Patent No.: US 9,736,373 B2
(45) Date of Patent: Aug. 15, 2017

(54) DYNAMIC OPTIMIZATION OF LIGHT SOURCE POWER

(71) Applicant: Intel Corporation, Santa Clara, CA (US)

(72) Inventor: Nizan Horesh, Caesarea (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,784

(22) PCT Filed: Oct. 25, 2013

(86) PCT No.: PCT/US2013/066888
§ 371 (c)(1),
(2) Date: Dec. 27, 2013

(87) PCT Pub. No.: WO2015/060869
PCT Pub. Date: Apr. 30, 2015

(65) Prior Publication Data
US 2016/0227113 A1    Aug. 4, 2016

(51) Int. Cl.
*H04N 5/232* (2006.01)
*G03B 15/03* (2006.01)
(Continued)

(52) U.S. Cl.
CPC ......... *H04N 5/23241* (2013.01); *G03B 15/03* (2013.01); *G06K 9/0061* (2013.01);
(Continued)

(58) Field of Classification Search
CPC ............... H04N 5/2256; H04N 5/2354; H04N 5/23241; H04N 5/2258; H05B 33/0812; H05B 33/0881; H05B 33/0869
(Continued)

(56) References Cited

U.S. PATENT DOCUMENTS 4,950,069 A * 8/1990 Hutchinson ............ A61B 3/113
351/210
6,283,954 B1    9/2001 Yee
(Continued)

FOREIGN PATENT DOCUMENTS

JP      2005269891 A    9/2005
KR    1020050025927 A    3/2005

OTHER PUBLICATIONS

Tomeo-Reyes, Inmaculada, et al. "Quality metrics influence on iris recognition systems performance." Security Technology (ICCST), 2011 IEEE International Carnahan Conference on. IEEE, 2011.*
(Continued)

*Primary Examiner* — Sath V Perungavoor
*Assistant Examiner* — Janese Duley
(74) *Attorney, Agent, or Firm* — Barnes & Thornburg LLP

(57) ABSTRACT

Technologies for power optimization of light sources include an imaging device to generate a captured image of a subject. The imaging device analyzes the captured image to determine, in the captured image, a location of the subject's eye relative to the imaging device, an iris-pupil contrast of the subject's eye, and a glint intensity of glints present on the subject's eye. The imaging device determines, for each of a plurality of light sources, an illumination efficiency based on a distance between the camera and the subject's eye, a distance between the light source and the subject's eye, an incidence angle of the light source relative to the subject's eye, and a power profile of the light source. The imaging device determines an amount of power to supply to each light source to reduce a total cumulative power supplied to the light sources based on one or more power constraints.

22 Claims, 7 Drawing Sheets

(51) Int. Cl.
*H04N 5/235* (2006.01)
*G06K 9/00* (2006.01)
*G06K 9/20* (2006.01)
*G06T 7/73* (2017.01)

(52) U.S. Cl.
CPC ....... *G06K 9/00604* (2013.01); *G06K 9/2027* (2013.01); *G06T 7/73* (2017.01); *H04N 5/2351* (2013.01); *H04N 5/2354* (2013.01); *H04N 5/23219* (2013.01); *G06T 2207/30041* (2013.01)

(58) Field of Classification Search
USPC .......................................................... 315/152
See application file for complete search history.

(56) References Cited

U.S. PATENT DOCUMENTS

| | | | |
|---|---|---|---|
| 6,542,081 B2 * | 4/2003 | Torch | A61B 3/0066 340/573.1 |
| 7,488,294 B2 * | 2/2009 | Torch | A61B 3/0066 600/372 |
| 8,890,946 B2 * | 11/2014 | Publicover | H04N 7/18 348/78 |
| 8,911,087 B2 * | 12/2014 | Publicover | A61B 5/162 351/200 |
| 2005/0199783 A1 | 9/2005 | Wenstrand et al. | |
| 2006/0147094 A1 | 7/2006 | Yoo | |
| 2008/0199165 A1 | 8/2008 | Ng et al. | |
| 2012/0206050 A1 * | 8/2012 | Spero | B60Q 1/04 315/152 |
| 2012/0294478 A1 * | 11/2012 | Publicover | G06K 9/00604 382/103 |
| 2013/0106681 A1 | 5/2013 | Eskilsson et al. | |
| 2013/0114850 A1 * | 5/2013 | Publicover | G06K 9/00604 382/103 |

OTHER PUBLICATIONS

Akashi, Y., and P. R. Boyce. "A field study of illuminance reduction." Energy and buildings 38.6 (2006): 588-599.*
International Search Report and Written Opinion received for PCT International Application No. PCT/US2013/066888, mailed Jul. 17, 2014, 11 pages.
Amarnag et al., "Real Time Eye Tracking for Human Computer Interfaces," IEEE ICME 2003, 4 pages.
Beutter et al, "Optimizing infra-red light collection for high-speed video-based eye tracking," Human Information Processing Research Branch, Human Factors Division, Ames Research Center.
Ohno et al., "FreeGaze: A Gaze Tracking System for Everyday Gaze Interaction," Proceedings of ETRA 2002, pp. 125-132 (2002).
Purkinje images, Wikipedia, https://en.wikipedia.org/wiki/Purkinje_images, retrieved Nov. 3, 2016 (2 pages).
"Techniques Based on Reflected Light," http://www.diku.dk/~panic/eyegaze/node9.html, retrieved Aug. 28, 2013 (3 pages).
Youmaran et al., "Using Infrared Illumination to Improve Eye & Face Tracking in Low Duality Video Images," Carleston University, 4 pages.
Zhu and Ji, "Robust real-time eye detection and tracking under variable lighting conditions and various face Drientations," Computer Vision and Image Understanding, vol. 98, pp. 124-154 (2005).
Zhu et al., " Combining Kalman Filtering and Mean Shift for Real Time Eye Tracking Under Active IR Illumination," IEEE ICPR (2002).

* cited by examiner

DYNAMIC OPTIMIZATION OF LIGHT SOURCE POWER

CROSS REFERENCE TO RELATED APPLICATIONS

This application is a national stage entry under 35 USC §371(b) of International Application No. PCT/US2013/066888, which was filed Oct. 25, 2013.

BACKGROUND

Eye and gaze tracking systems have been implemented in various applications to track a user's eye movements and/or the direction in which the user is looking (i.e., the user's gaze direction). The range of such applications extends from serious (e.g., airport security systems) to playful (e.g., video game avatar renderings). Typical eye tracking systems may use various technologies to track a user's eye movements and/or gaze direction. Many of those technologies rely on light reflected by the person's eye and various relationships between the parts of the eye (e.g., the structure of the eye and the contrast between parts of the eye). For example, eye and gaze tracking systems may employ limbus tracking, pupil tracking, Purkinje tracking, and/or other tracking mechanisms (e.g., based on reflected light or other characteristics).

In many implementations, an infrared (IR) camera includes high-intensity IR light sources that are used to illuminate a person's eye in conjunction with IR sensors that are used to detect the reflections (i.e., glints or Purkinje images) from the person's retina/cornea. The precision and accuracy of the gaze estimations are largely a function of the ability to accurately detect and identify various characteristics of the reflections (e.g., location and intensity). Additionally, the high-intensity light used for illumination may result in a significant amount of power consumption, particularly for imaging devices and other mobile computing devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
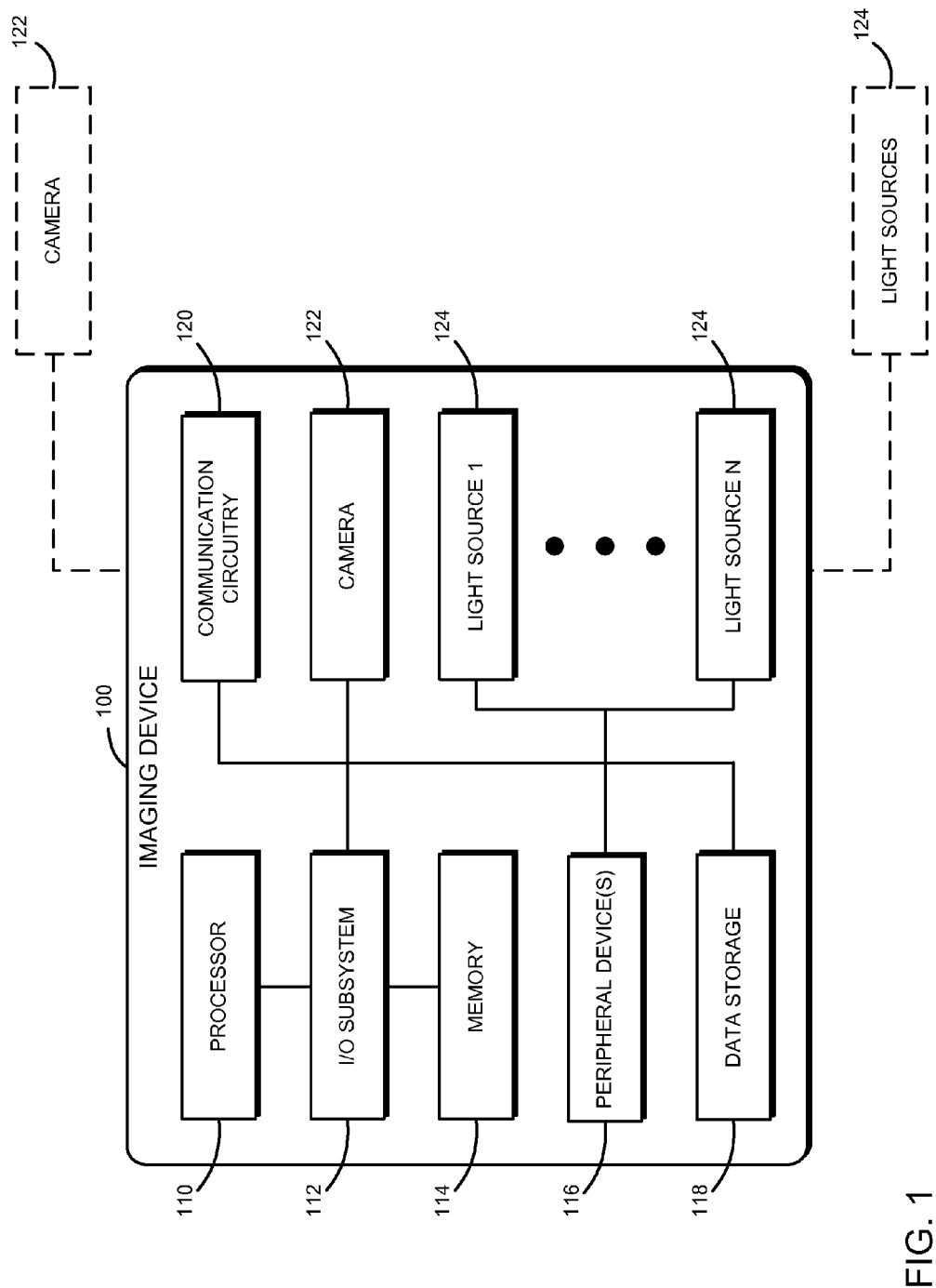
FIG. 1 is a simplified block diagram of at least one embodiment of an imaging device to optimize light source power during gaze tracking.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an imaging device 100 includes a camera 122 and one or more light sources 124 associated therewith to facilitate gaze tracking of a user (either on the imaging device 100 itself or on an associated computing device). In use, the imaging device 100 is configured to optimize the power supplied to the light sources 124 during gaze tracking to conserve energy. To do so, in some embodiments, the imaging device 100 balances the power consumed by the light sources 124 and the image quality of the images captured by the camera 122. That is, the imaging device 100 endeavors to calculate a precise and robust gaze point for gaze tracking with minimal power consumption by the light sources 124. As discussed below, the imaging device 100 optimizes the power based on various image quality constraints. For example, to perform proper gaze tracking, the iris-pupil contrast of the user's eye captured in the images may need to be above a certain threshold value, and the glints reflected off the subject's eye may need to be prominent but not oversaturated. Although the imaging device 100 endeavors to "optimize" the power supplied to the light sources 124 as discussed in more detail below, it should be appreciated that due to any number of factors (e.g., practical and/or implementation concerns) the actual total power consumption by the light sources 124 may not be reduced to the ideal minimum or truly optimal power in some embodiments. That is, the optimization of the power supplied to the light sources 124 may be evidenced in some embodiments as a reduction in such power.

The imaging device 100 may be embodied as any type of computing device for capturing images and which is capable performing the functions described herein. For example, the imaging device 100 may be embodied as a stand-alone digital camera, cellular phone, smartphone, tablet computer, netbook, notebook, Ultrabook™, laptop computer, personal digital assistant, mobile Internet device, desktop computer, Hybrid device, and/or any other computing/communication device. As shown in FIG. 1, the illustrative imaging device 100 includes a processor 110, an input/output ("I/O") subsystem 112, a memory 114, one or more peripheral devices 116, a communication circuitry 120, a camera 122, and a plurality of light sources 124. Of course, the imaging device 100 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the imaging device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the imaging device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the imaging device 100, on a single integrated circuit chip.

The peripheral devices 116 of the imaging device 100 may include any number of additional peripheral or interface devices. The particular devices included in the peripheral devices 116 may depend on, for example, the type and/or intended use of the imaging device 100. As discussed below, in some embodiments, the imaging device 100 may predict the location of the subject's eyes at a future time (e.g., the next captured frame) instead of using the current location of the subject's eyes for analyses. As such, the illustrative peripheral devices 116 may include one or more sensors, which may include any number and type of sensors depending on, for example, the type and/or intended use of the imaging device 100. The sensors may include, for example, proximity sensors, inertial sensors, optical sensors, light sensors, audio sensors, temperature sensors, thermistors, motion sensors, and/or other types of sensors. Of course, the imaging device 100 may also include components and/or devices configured to facilitate the use of the sensors.

The data storage 118 may be embodied as any type of device or devices configured for short-term or long-term storage of data such as, for example, memory devices and circuits, memory cards, hard disk drives, solid-state drives, or other data storage devices. The communication circuitry 120 may be embodied as any communication circuit, device, or collection thereof, capable of enabling communications between the imaging device 100 and other remote devices over a network (not shown). To do so, the communication circuitry 120 may use any suitable communication technology (e.g., wireless or wired communications) and associated protocol (e.g., Ethernet, Bluetooth®, Wi-Fi®, WiMAX, etc.) to effect such communication depending on, for example, the type of network, which may be embodied as any type of communication network capable of facilitating communication between the imaging device 100 and remote devices.

The camera 122 may be embodied as any peripheral or integrated device suitable for capturing images, such as a still camera, a video camera, a webcam, or other device capable of capturing video and/or images. As discussed in more detail below, the camera 122 captures images of a person's eye(s) that are to be tracked. Of course, in doing so, the scene captured by the camera 122 may also include other objects (e.g., the user's face or entire body) depending on the particular embodiment. In some embodiments, the camera 122 may be embodied as a three-dimensional (3D) camera, depth camera, bifocal camera, and/or be otherwise capable of generating a depth image, channel, or stream. Additionally or alternatively, in some embodiments, the camera 122 captures images that may be analyzed to determine the light intensity levels of those images. Although the illustrative imaging device 100 includes a single camera 122, it should be appreciated that the imaging device 100 may include multiple cameras 122 in other embodiments, which may be used to capture images of the subject's eyes, for example, from different perspectives. The camera 122 may also include one or more imaging sensors, such as infrared sensors, to capture the images. As discussed below, the captured images are analyzed for eye detection and/or gaze tracking of a subject in the field of view of the camera 122.

The light source(s) 124 may be embodied as any type of light source capable of illuminating an object being tracked by the imaging device 100 (e.g., the subject's eyes). For example, in the illustrative embodiment, the light sources 124 are embodied as infrared light sources configured to project infrared light into the subject's eyes (e.g., used in conjunction with infrared sensors). Additionally, in the illustrative embodiments, the light sources 124 are embodied as directional light sources with illumination power dependent on the angle of incidence and distance from the reflection surface (e.g., the subject's eye). For example, each of the light sources 124 has a particular power profile correlating the incidence angle with the relative power of the light source 124. The light sources 124 may be configured to illuminate the entire scene (i.e., the area within the field of view of the camera 122) or, in other embodiments, to illuminate only the subject's eyes or some portion of the scene. Of course, it should be appreciated that the light sources 124 may be dedicated to image illumination in some embodiments. As discussed herein, the light (e.g., infrared light) transmitted from the light sources 124 is reflected off the subject's eye and captured by the camera 122 for image analysis (e.g., glint analysis). Further, as shown in FIG. 1, it should be appreciated that, in some embodiments, any of the camera 122 and/or the light sources 124 may be separate from and remote to, but communicatively coupled with, the imaging device 100.

Figure 2:
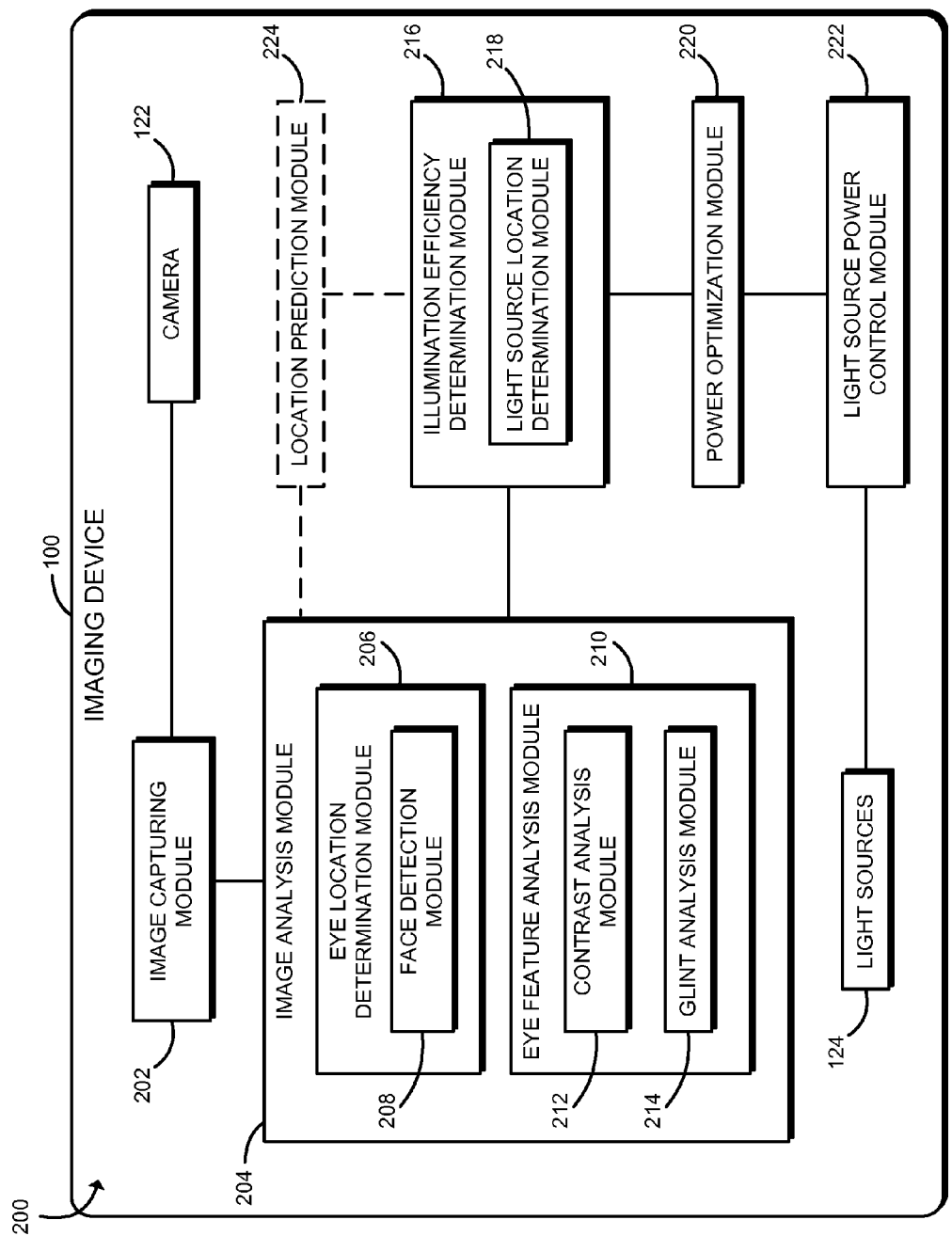
FIG. 2 is a simplified block diagram of at least one embodiment of an environment of the imaging device of FIG. 1.

Referring now to FIG. 2, in use, the imaging device 100 establishes an environment 200 to optimize light source power. As discussed below, the imaging device 100 computes the illumination efficiency of one or more of the light sources 124 (e.g., each light source 124) given the relative location of the subject's eyes being tracked and dynamically adjusts the amount of power driving the light sources 124 in order to reduce or minimize the total power output of the light sources 124 while increasing or maximizing the pupil-iris contrast and keeping the glints well exposed.

The illustrative environment 200 of the imaging device 100 includes an image capturing module 202, an image analysis module 204, an illumination efficiency determination module 216, a power optimization module 220, and a light source power control module 222. Additionally, the image analysis module 204 includes an eye location determination module 206, which includes a face detection module 208, and an eye feature analysis module 210, which includes a contrast analysis module 212 and a glint analysis module 214. Further, the illumination efficiency determination module 216 includes a light source location determination module 218. As shown in FIG. 2 and discussed below, in some embodiments, the environment 200 also includes a location prediction module 224. Each of the image capturing module 202, the image analysis module 204, the eye location determination module 206, the face detection module 208, the eye feature analysis module 210, the contrast analysis module 212, the glint analysis module 214, the illumination efficiency determination module 216, the light source location determination module 218, the power optimization module 220, the light source power control module 222, and the location prediction module 224 may be embodied as hardware, software, firmware, or a combination thereof. Additionally, in some embodiments, one of the illustrative modules may form a portion of another module (e.g., the light source power control module 222 may form a portion of the power optimization module 220).

The image capturing module 202 controls the camera 122 to capture images within the field of view of the camera 122 (e.g., for eye and gaze tracking). It should be appreciated that the imaging device 100 may track one or both of the subject's eyes and, therefore, the captured images analyzed by the imaging device 100 include at least one of the subject's eyes. Although eye and gaze tracking and analysis is, at times, discussed herein in reference to a single eye of the subject for simplicity and clarity of the description, the techniques described herein equally apply to tracking both of the subject's eyes.

The image analysis module 204 receives the images captured with the camera 122 from the image capturing module 202 (e.g., captured as streamed video or as individual images/frames). As discussed in more detail below, the image analysis module 204 analyzes each of the images (e.g., each frame of a streamed video or a subset thereof) for gaze tracking and power optimization. In the illustrative embodiment, the image analysis module 204 uses glints (i.e., first Purkinje images) reflected off the cornea of the subject's eye for gaze tracking. It should be appreciated that the image analysis module 204 may utilize any suitable eye tracking algorithm and may consider other features of the subject's eye for doing so.

The eye location determination module 206 determines the location of the subject's eye relative to the imaging device 100. In doing so, the eye location determination module 206 detects the existence of one or more person's eyes in a captured image and determines the location of the eye in the captured image (i.e., the portion of the image associated with the eye) that is to be tracked. To do so, the eye location determination module 206 may use any suitable techniques, algorithms, and/or image filters (e.g., edge detection and segmentation). In some embodiments, the face detection module 208 detects the existence of one or more person's faces in an image to, for example, reduce the region of the captured image that is analyzed to locate the subject's eye(s). Further, in some embodiments, the face detection module 208 may identify a person based on their detected face (e.g., through biometric algorithms and/or other face recognition or object correlation algorithms). As such, in embodiments in which multiple persons are tracked, the face detection module 208 may distinguish between those persons in the captured images to enhance tracking quality. Of course, in other embodiments, the eye location determination module 206 may make a determination of the location of the person's eyes independent of or without a determination of the location of the person's face.

The eye location determination module 206 analyzes the region of the captured image corresponding with the subject's eye to find the reflections of the light sources 124 off the subject's cornea (i.e., the glints) and/or the pupil. Based on those reflections, the eye location determination module 206 determines the location or position (e.g., in three-dimensional space) of the subject's eye relative to the imaging device 100. It should be appreciated that the eye location determination module 206 may utilize any suitable algorithms and/or techniques for doing so. In the illustrative embodiment, the location of the subject's eye is determined relative to a point on the imaging device 100 (e.g., relative to the camera 122). However, in other embodiments, an absolute position or location of the subject's eye may be determined (e.g., using a global positioning system in conjunction with the location of the subject's eye relative to the imaging device 100). Further, as discussed above, in some embodiments, both of the subject's eyes are tracked and, therefore, the location of each eye may be determined.

The eye feature analysis module 210 analyzes various features of the subject's eyes used, for example, in eye tracking. Specifically, the contrast analysis module 212 determines an amount of contrast between the iris and the pupil of the subject's eye (i.e., an iris-pupil contrast). It should be appreciated that a minimal level of contrast between the iris and the pupil is typically necessary to distinguish between those parts of the eye for tracking purposes. In the illustrative embodiment, the contrast analysis module 212 identifies the region of the subject's eye in the captured image (e.g., a set of image pixels) corresponding with the iris (i.e., an iris region) and the region of the subject's eye in the captured image corresponding with the subject's pupil (i.e., a pupil region). The iris-pupil contrast is determined by comparing the intensity of the pixels in the iris region with the intensity of the pixels in the pupil region. For example, the contrast analysis module 212 may determine the average intensity of pixels (i.e., the expected value of the pixels) in the captured image in each of the iris region and the pupil region and, additionally, may define the iris-pupil contrast as the difference between those average intensities. Of course, in other embodiments, the contrast analysis module 212 may employ other techniques to determine the contrast between the iris and the pupil of the subject's eye.

As indicated above, each light source 124 may shine light (e.g., infrared light) toward the subject, which is reflected off the cornea of the subject's eye thereby causing a glint to appear on the subject's eye. The glint analysis module 214 determines the intensity of one or more glints present on the subject's eye in the captured image (i.e., the glint intensity). For example, the glint intensity of each glint may be determined in some embodiments. In doing so, the glint analysis module 214 detects the existence of one or more glints in the captured image and identifies a region of the captured image corresponding with each of the detected glints (i.e., a glint region). In the illustrative embodiment, the glint intensity of a particular glint is defined as the maximum intensity of pixels of the captured image corresponding to the glint region of that particular glint. In other embodiments, the glint intensity may be calculated or otherwise determined using other suitable techniques or algorithms. For example, the glint intensity may be defined as the average intensity of pixels in the glint region. Further, it should be appreciated that, in some cases, the glint regions for distinct glints may overlap one another.

As discussed above, in some embodiments, the imaging device 100 may analyze the captured images and/or otherwise make determinations based on a predicted location of the subject's eyes rather than a location of the subject's eyes in the currently analyzed captured image. One embodiment of a method and device for predicting the location of a subject's eye is described in PCT International Application Serial No. PCT/US13/59969, entitled "Camera and Light Source Synchronization for Object Tracking," which was filed on Sep. 16, 2013, As described therein, an imaging device may predict the next location of the object being tracked based on, for example, the current position of the object (i.e., based on image analysis) and sensor data (e.g., from inertial sensors). Accordingly, the location prediction module 224 may predict the next location of the subject's eye and base eye location determinations, for example, on the predicted location rather than the current location of the subject's eye.

The illumination efficiency determination module 216 determines the illumination efficiency of one or more of the light sources 124 (e.g., each light source 124) based on, for example, the relative distance between the imaging device 100 (e.g., the camera 122 and/or the light sources 124) and the subject's eye and the power profile of the corresponding light sources 124. In doing so, the illumination efficiency determination module 216 receives the location of the subject's eye relative to the camera 122 (e.g., in three-dimensional space) from the image analysis module 204. Based on that information, the distance between the camera 122 and the subject's eye is calculated. As discussed above, the relative location of the subject's eye may be determined based on any particular point of the imaging device 100 depending on the particular embodiment. If the relative location is based on a point on the imaging device 100 other than the camera 122, it should be appreciated that the location of the subject's eye relative to the camera 122 may, nonetheless, be determined. The imaging device 100 may utilize intrinsic, structural, and/or geometric properties of the imaging device 100 to make such a determination.

Figure 6:
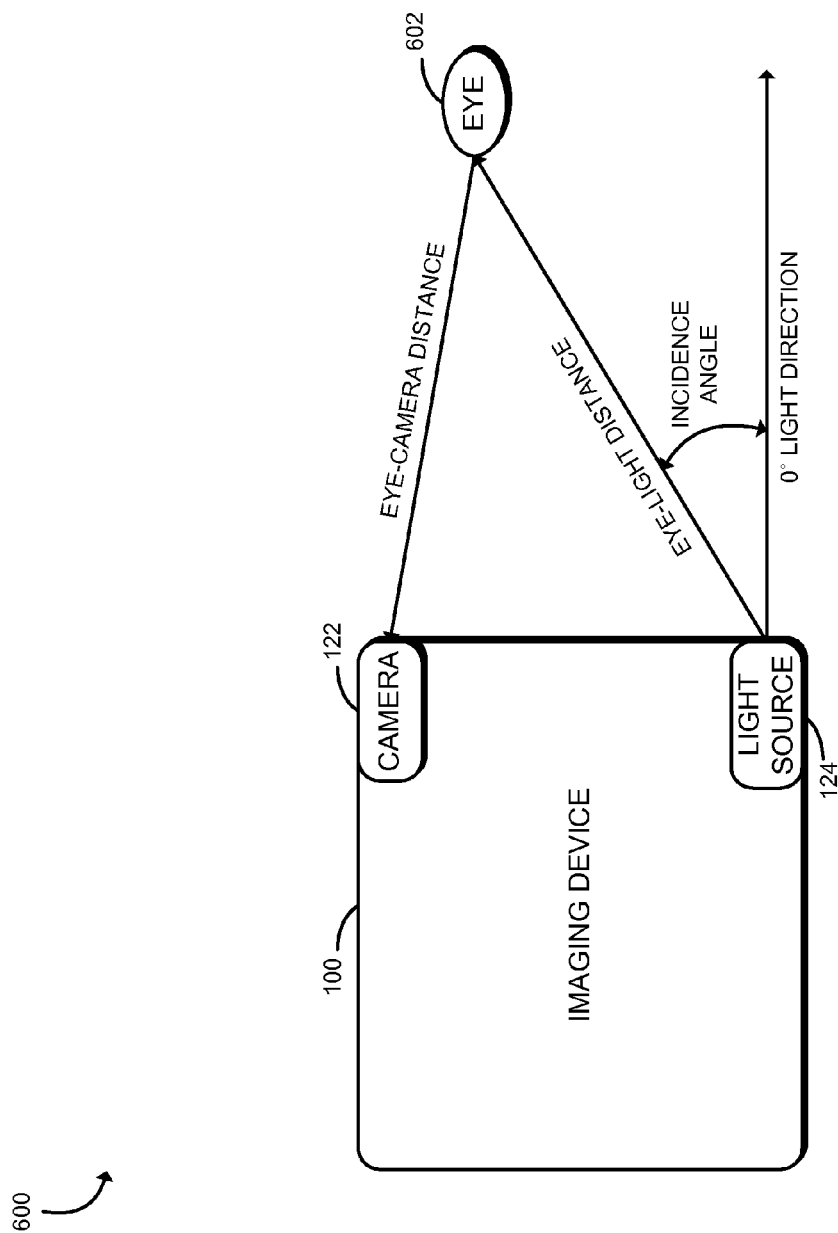
FIG. 6 is a simplified block diagram of at least one embodiment of spatial relationships between the imaging device of FIG. 1 and a subject's eye that the imaging device is analyzing.

As discussed above, the illumination efficiency determination module 216 includes the light source location determination module 218, which is configured to determine the location of the subject's eye relative to one or more of the light sources 124 (e.g., each light source 124). More specifically, the light source location determination module 218 may determine the distance and incidence angle of each light source 124 to the subject's eye. As described above, the light sources 124 are directional light sources and, therefore, "point" in a particular direction (i.e., the zero degree light direction). The incidence angle is defined as the angle between the zero degree light direction and the line intersecting the corresponding light source 124 and the subject's eye. As shown in FIG. 6, for any given light source 124 shining on a subject's eye 602, there is a specific distance defined between the eye 602 and the camera 122 of the imaging device 100 (i.e., the eye-camera distance), a specific distance defined between the eye 602 and the given light source 124 (i.e., the eye-light distance), and a specific incidence angle of the given light source 124 relative to the eye 602. In the illustrative embodiment, the distance between a particular light source 124 and the subject's eye and the incidence angle of the light source relative to the subject's eye are determined based on the coordinate system and/or other known properties of the camera 122 or the imaging device 100.

Figure 7:
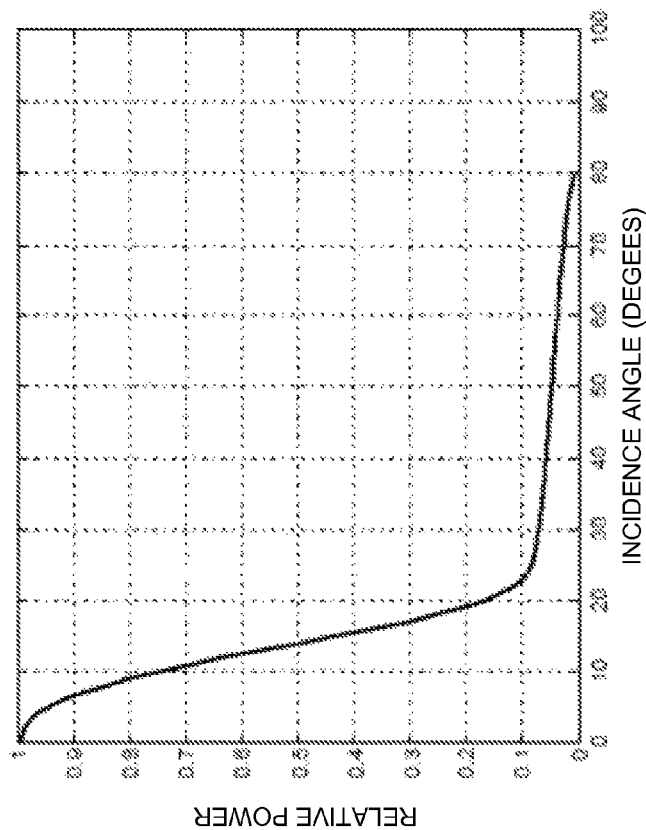
FIG. 7 is a simplified graph of at least one embodiment of a power profile for a light source of the imaging device of FIG. 1.

In some embodiments, the illumination efficiency of each of the light sources 124 is based on the illumination density of the corresponding light source 124. Accordingly, in such embodiments, the illumination efficiency determination module 216 determines the illumination density and/or the normalized illumination density of each light source 124 based on the distance between the corresponding light source 124 and the subject's eye, and the incidence angle of the corresponding light source 124. For example, the illumination density may be computed based on parameters or intrinsic properties of the corresponding light source 124. As discussed herein, the light sources 124 are directional and each light source 124 has its own relative power profile, which may be normalized. For example, a particular light source 124 may have a power profile as shown in the illustrative graph of FIG. 7. In that particular embodiment, the vast majority of the power of the light source 124 is concentrated within twenty degrees of the zero degree light direction of the light source 124 (i.e., having an incident angle of twenty degrees or less). As shown, the relative power outside that range is marginal.

The power optimization module 220 receives the illumination efficiency determined for each of the light sources 124 and various image parameters (e.g., the iris-pupil contrast, glint intensity, and/or the glint-eye contrast). In some embodiments, the glint-eye contrast may be determined similar to the iris-pupil contrast as discussed above but instead compares the glint region with surrounding non-glint regions of the eye. The power optimization module 220 optimizes (e.g., reduces or minimizes) the total cumulative power of the light sources 124 based on the image parameters and one or more power constraints. It should be appreciated that the power optimization module 220 may optimize (e.g., reduce or minimize) the total power of the light sources 124 using any suitable techniques and/or algorithms. For example, the power optimization module 220 may utilize simplex or ellipsoid optimization algorithms, linear or nonlinear optimization techniques, cost functions, and/or other suitable optimization mechanisms. Additionally, the particular constraints optimized may vary depending on the particular embodiment.

The light source power control module 222 regulates the amount of power supplied to the light sources 124. As such, the light source power control module 222 supplies an amount of power to each of the light sources 124 based on the optimized total power of the light sources 124. Of course, based on the optimization constraints employed, the amount of power supplied to two light sources 124 may differ in some cases. It should be appreciated that the light source power control module 222 may utilize any suitable mechanism for regulating the amount of power supplied to the light sources 124. For example, the light source power control module 222 may employ analog mechanisms (e.g., power limiting) and/or digital mechanisms (e.g., duty-cycle modification) to regulate the power supplied to each of the light sources 124 and thereby effect the intensity of light projected from the light sources 124.

It should also be appreciated that the light source power control module 222 may not have information related to one or more constraints when the first image is captured (e.g., iris-pupil contrast or glint intensity) and, therefore, may be unable to accurately reduce or optimize the power of the light sources 124. Accordingly, in some embodiments, the light source power control module 222 supplies a default amount of power to the light sources 124 (e.g., full power or half power) until the imaging device 100 captures and analyzes the first image or otherwise has information necessary for the evaluation of the constraints. Once the imaging device 100 has the necessary information, the imaging device 100 may utilize the mechanisms described herein for optimizing the power supplied to the light sources 124. In other embodiments, the imaging device 100 may ignore one or more constraints (e.g., until necessary constraint parameters are available).

Figure 3:
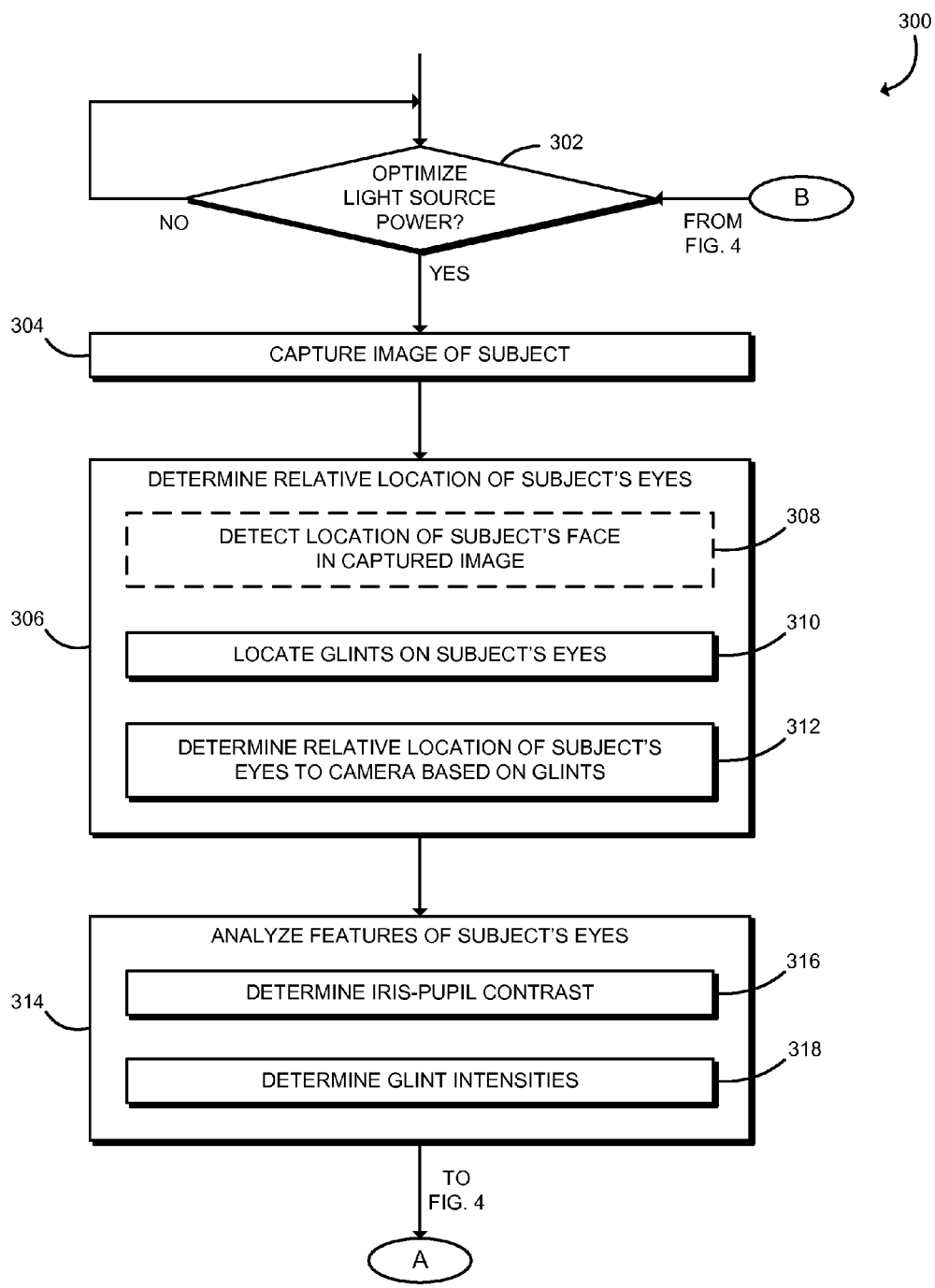
FIGS. 3 and 4 are a simplified flow diagram of at least one embodiment of a method for optimizing light source power on the imaging device of FIG. 1.
Figure 4:
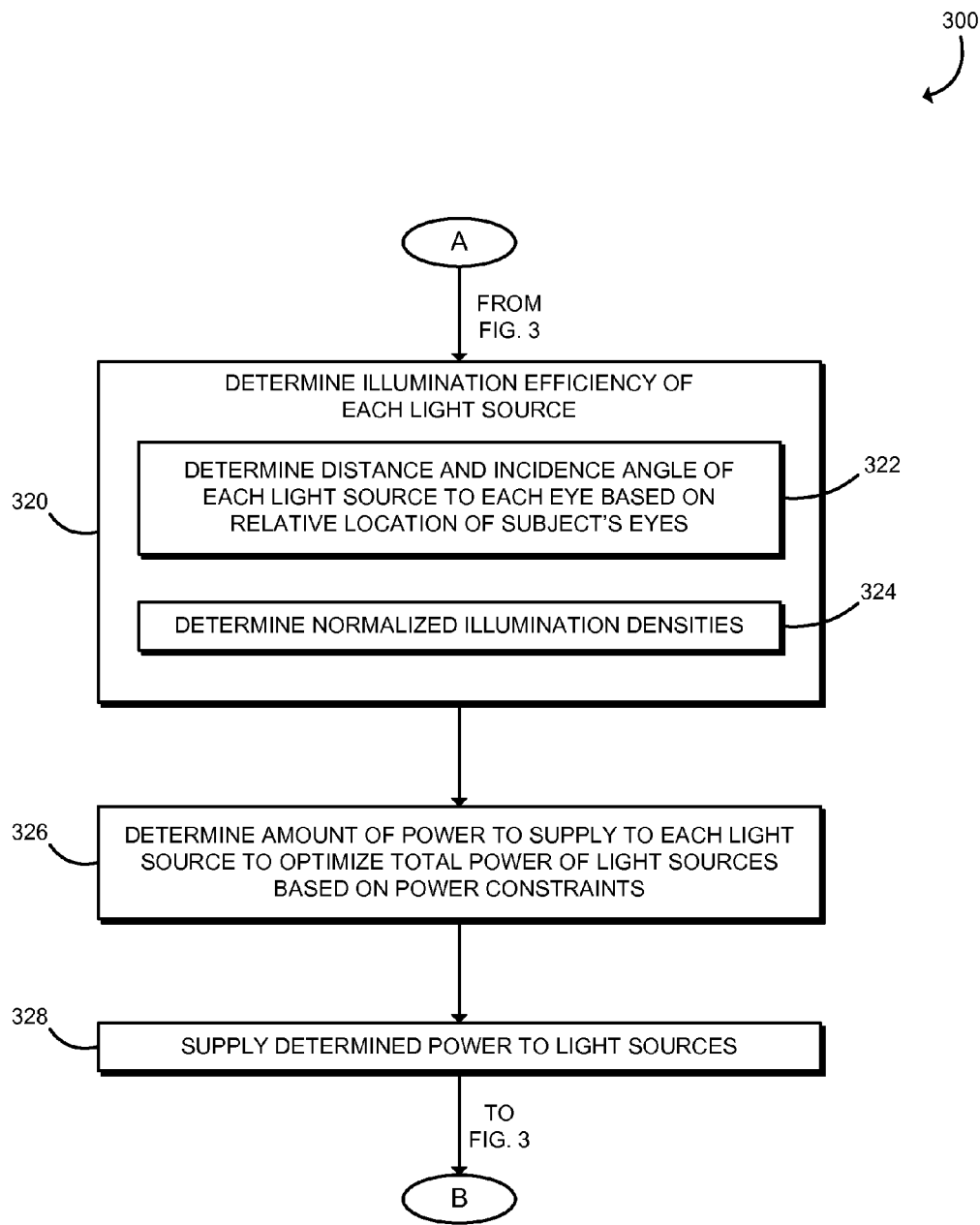

Referring now to FIGS. 3 and 4, in use, the imaging device 100 may execute a method 300 for optimizing light source power. The illustrative method 300 begins with block 302 of FIG. 3 in which the imaging device 100 determines whether to optimize power supplied to the light sources 124 of the imaging device 100. The power of the light sources 124 may be reduced or minimized to a level that still maintains sufficient image quality and characteristics for eye and gaze tracking. If the imaging device 100 determines to optimize light source power, the imaging device 100 captures an image of the subject (i.e., including the subject's tracked eyes) in block 304. As discussed above, the imaging device 100 may capture video (e.g., in a stream) and analyze each frame/image (or a portion of the frames) of the captures video in some embodiments. Of course, as discussed above, the imaging device 100 may track one or both of the subject's eyes.

In block 306, the imaging device 100 determines the location of the subject's eyes relative to the imaging device 100. As discussed above, to do so, the imaging device 100 identifies a region of the captured image corresponding with the subject's eyes. In block 308, the imaging device 100 may detect the location of the subject's face in the captured image, for example, to reduce the "search" area of the captured image to more efficiently locate the subject's eye(s) using a suitable face detection technique or algorithm. However, in some embodiments, the imaging device 100 may determine the location of the subject's eye(s) independent of or without a determination of the location of the subject's face. In block 310, the imaging device 100 analyzes each image region including the subject's eye to locate glints present on the subject's eye (i.e., reflections of light off the subject's cornea), which the imaging device 100 may use in block 312 to determine the three-dimensional location of the subject's eyes relative to the camera 122 or other point on the imaging device 100. As discussed above, the imaging device 100 may utilize any suitable glint analysis technique or algorithm for doing so.

In block 314, the imaging device 100 analyzes one or more features of the subject's eyes in the captured image used, for example, in eye and gaze tracking. In the illustrative embodiment, the imaging device 100 determines the iris-pupil contrast of each of the subject's eyes in block 316 and the glint intensity of each glint (or a subset thereof) present on the subject's eye in block 318. In doing so, the imaging device 100 identifies various regions of the subject's eye in the captured image as discussed above. Specifically, the imaging device 100 determines the region corresponding with the subject's iris, the region corresponding with the subject's pupil, and each region corresponding with the presence of a glint on the subject's eye. As discussed above, the iris-pupil contrast may be determined, for example, by comparing the intensity of the pixels corresponding with the iris region of the subject's eye to the intensity of the pixels corresponding with the pupil region (e.g., the difference between the average intensities of the regions). Additionally, the glint intensity may be determined based on an analysis of the pixels corresponding with region of the captured image corresponding with the particular glint (e.g., a maximum intensity value of the pixels in that region).

In the illustrative embodiment, the contrast analysis module 212 identifies the region of the subject's eye in the captured image (e.g., a set of image pixels) corresponding with the iris (i.e., an iris region) and the region of the subject's eye in the captured image corresponding with the subject's pupil (i.e., a pupil region). The iris-pupil contrast is determined by comparing the intensity of the pixels in the iris region with the intensity of the pixels in the pupil region. For example, the contrast analysis module 212 may determine the average intensity of pixels (i.e., the expected value of the pixels) in the captured image in each of the iris region and the pupil region and, additionally, may define the iris-pupil contrast as the difference between those average intensities. Of course, in other embodiments, the contrast analysis module 212 may employ other techniques to determine the contrast between the iris and the pupil of the subject's eye.

As indicated above, each light source 124 may shine light (e.g., infrared light) toward the subject, which is reflected off the cornea of the subject's eye thereby causing a glint to appear on the subject's eye. The glint analysis module 214 determines the intensity of one or more glints present on the subject's eye in the captured image (i.e., the glint intensity). For example, the glint intensity of each glint may be determined in some embodiments. In doing so, the glint analysis module 214 detects the existence of one or more glints in the captured image and identifies a region of the captured image corresponding with each of the detected glints (i.e., a glint region). In the illustrative embodiment, the glint intensity of a particular glint is defined as the maximum intensity of pixels of the captured image corresponding to the glint region of that particular glint. In other embodiments, the glint intensity may be calculated or otherwise determined using other suitable techniques or algorithms. For example, the glint intensity may be defined as the average intensity of pixels in the glint region. Further, it should be appreciated that, in some cases, the glint regions for distinct glints may overlap one another.

In block 320 (see FIG. 4), the imaging device 100 determines the illumination efficiency of each light source 124. As discussed above, in doing so, the imaging device 100 determines the distance and incidence angle of each light source 124 to each of the subject's eyes based the location of the subject's eyes relative to the imaging device 100. Additionally, in block 324, the imaging device 100 may determine the normalized illumination density of each light source 124 based on the distance and the incidence angle between the corresponding light source 124 and the corresponding eye of the subject (e.g., based on characteristics of the light source 124). In the illustrative embodiment, the imaging device 100 determines the illumination efficiency of a particular light source 124 based on, more specifically, the distance between the camera 122 and the subject's eye, the distance between the corresponding light source 124 and the subject's eye, the incidence angle of the corresponding light source 124 relative to the subject's eye, and the power profile of the corresponding light source 124. For example, the illumination efficiency may be defined by the expression, $$\frac{C \cdot L(\theta)}{D_{EL}^2 D_{EC}^2},$$

where C is a scalar coefficient related to the camera, $\theta$ is the incidence angle of the corresponding light source 124, $L(\,)$ is the power profile (e.g., normalized) of the corresponding light source 124 and is dependent on the incidence angle of the corresponding light source 124, $D_{EL}$ is the distance between the corresponding light source 124 and the subject's eye, and $D_{EC}$ is the distance between the camera 122 and the subject's eye. In some embodiments, the value of C in the expression for illumination efficiency provided above corresponds with the light-gathering ability of the camera 122 and may, for example, be empirically determined.

In block 326, the imaging device 100 determines an amount of power to supply to each light source 124 to reduce or optimize the total power supplied to the light sources 124 based on one or more power constraints. In other words, the sum $$\sum_i^N T_i \cdot P_i$$

is minimized or reduced based on the power constraints, where i is an index of the corresponding light source 124, $T_i$ is an activation time of the corresponding light source 124 (i.e., the amount of time the light is "on," $P_i$ is the power supplied to the corresponding light source 124, and N is the total number of light sources 124 optimized (e.g., minimized or reduced). As discussed above, the imaging device 100 may utilize any suitable techniques and/or algorithms to reduce or optimize the total power supplied to the light sources 124, and the particular power constraints may vary depending on the particular embodiment. Additionally, in some embodiments, optimization (e.g., minimization or reduction) is performed based on characteristics/parameters related to one of the subject's eyes, whereas in other embodiments, optimization is based on characteristics/parameters related to each of the subject's eyes. For example, the iris-pupil contrast, glint intensity, and glint-eye contrast of each of the subject's eyes may be considered.

Figure 5:
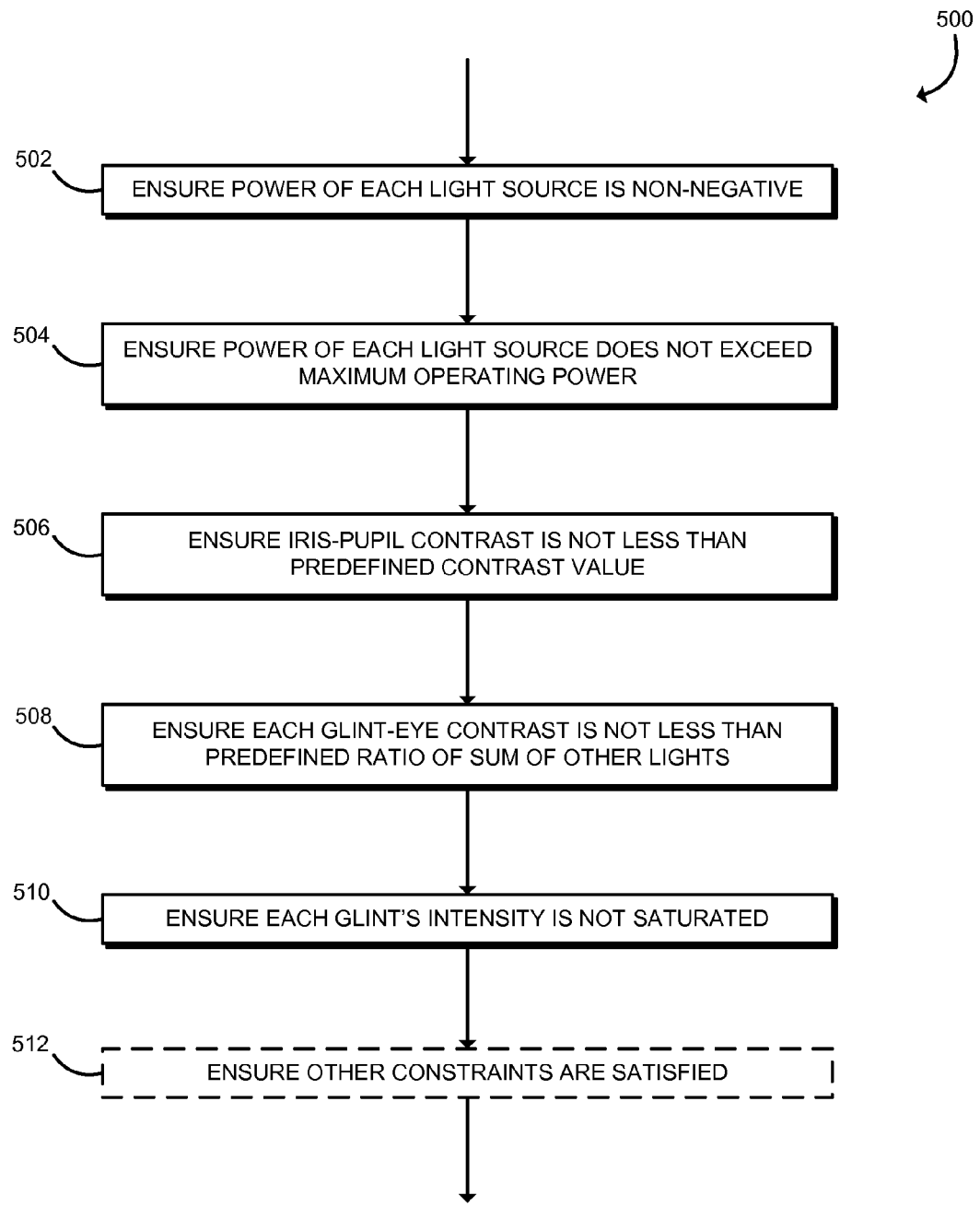
FIG. 5 is a simplified flow diagram of at least one embodiment of a method for optimizing a total power of light sources based on power constraints on the imaging device of FIG. 1.

In the illustrative embodiment, the power constraints are related to the power supplied to the light sources 124, the iris-pupil contrast of the subject's eye, the glint-eye contrast of the glints present on the subject's eye, and the glint intensity of the glints. To determine the optimal (e.g., reduced or minimum) amount of power to supply to the light sources 124, the imaging device 100 may execute a method 500 for reducing or optimizing total light source power based on particular power constraints as shown in FIG. 5. The illustrative method 500 begins with block 502 in which the imaging device 100 ensures the power supplied to each light source 124 is non-negative. In other words, the imaging device 100 ensures that $P_i \geq 0$ for each light source i, where P is the power supplied to the particular light source i. In block 504, the imaging device 100 ensures that the power supplied to each light source 124 does not exceed the maximum operating power of the light source 124. That is, the imaging device 100 ensures that $P_i \leq P_{MAX_i}$ for each light source i, where P is the power supplied to the particular light source i and $P_{MAX_i}$ is the maximum operating power of the particular light source i. It should be appreciated that the power constraints described in blocks 502 and 504 ensure that the power determined (i.e., based on optimization) to be supplied to each light source 124 falls within physically realizable values for the particular light source 124.

In block 506, the imaging device 100 ensures the iris-pupil contrast (e.g., of each eye) is not less than a predefined contrast value. In other words, the imaging device 100 ensures that $$\sum_i T_i \cdot E_i \cdot P_i \geq IPC_0,$$

where i is the index of the corresponding light source 124, $T_i$ is an activation time of the corresponding light source 124, $E_i$ is the illumination efficiency of the corresponding light source 124, P is the power supplied to the corresponding light source 124, and $IPC_0$ is the predefined contrast value. It should be appreciated that the predefined contrast value may be any suitable value and, in some embodiments, may account for the conversion between units of measure for light intensity and intensity contrast. Additionally, in some embodiments, the power constraint may also consider the effects of ambient or stray light and may, therefore, be modified to $$\sum_i T_i \cdot E_i \cdot P_i + T_i \cdot \text{Ambient} \geq IPC_0.$$

In block 508, the imaging device 100 ensures that each glint-eye contrast is not less than a predefined ratio of the sum of light from the light sources 124 (i.e., the light source 124 causing the glint and the other light sources 124) illuminating the subject's eye. That is, the imaging device 100 ensures that $$SR \cdot T_i \cdot E_i \cdot P_i \geq DR \cdot \sum_j (T_j \cdot E_j \cdot P_j),$$

where i is the index of the corresponding light source 124, j is an index of the other light sources 124 (i.e., the light source 124 causing the glint and the other light sources 124), T is an activation time of the indexed light source 124, E is the illumination efficiency of the indexed light source 124, P is the power supplied to the indexed light source 124, SR is a specular reflection coefficient (i.e., related to the reflectance of the single light source 124) and DR is a diffusive reflection coefficient (i.e., related to absolute reflectance of the iris).

In block 510, the imaging device 100 ensures that each glint's intensity is not saturated. In other words, the imaging device 100 ensures that $T_i \cdot E_i \cdot P_i \leq PRI$, where i is the index of the corresponding light source 124, $T_i$ is an activation time of the corresponding light source 124, $E_i$ is the illumination efficiency of the corresponding light source 124, $P_i$ is the power supplied to the corresponding light source 124, and PRI is a maximum non-saturated pixel intensity. In some embodiments, the maximum non-saturated pixel intensity may be empirically determined as a static value, whereas in other embodiments, it may be dynamically determined by the expression $$\frac{GI}{E_i \cdot P_i} \leq SI,$$

where GI is the glint intensity of the particular glint and SI is the saturation intensity, a known parameter of the imaging device 100.

In block 512, the imaging device 100 ensures that other constraints, if any, are satisfied. In the illustrative embodiment, assuming no other constraints are considered in block 512, the imaging device 100 solves an optimization problem (e.g., using a suitable algorithm or technique) including the following five equations:

$$P_i \geq 0,$$

$$P_i \leq P_{MAX_i},$$

$$\sum_i T_i \cdot E_i \cdot P_i \geq IPC_0,$$

$$SR \cdot T_i \cdot E_i \cdot P_i \geq DR \cdot \sum_j (T_j \cdot E_j \cdot P_j),$$

and $$T_i \cdot E_i \cdot P_i \leq PRI.$$

Additionally, in some embodiments, the imaging device 100 may implement a closed-loop system by iteratively modifying one or more predefined values (e.g., $IPC_0$ and/or PRI) by a certain step amount (e.g., 10%) to adjust the optimization parameters.

Referring back to FIG. 4, in block 328, the imaging device 100 supplies the determined amount of power to the light sources 124 based on the results of the supplied power optimization. As discussed above and illuminated by the power constraints discussed in FIG. 5, the power supplied to the light sources 124 may differ from light source 124 to light source 124 based on the image analysis and power optimization. For example, in one embodiment, a light source 124 shining directly on the subject's eye may be supplied more power than a light source 124 having a large incidence angle relative to the subject's eye. The method 300 returns (e.g., immediately or after a predefined internal) to block 302 of FIG. 3 in which the imaging device 100 again determines whether to optimize the power supplied to the light sources 124. In other words, the imaging device 100 determines whether to reevaluate the various parameters and optimize based on the new values.

EXAMPLES

Illustrative examples of the technologies disclosed herein are provided below. An embodiment of the technologies may include any one or more, and any combination of, the examples described below.

Example 1 includes an imaging device for power optimization of light sources of the imaging device, the imaging device comprising a camera to generate a captured image of a subject; an image analysis module to analyze the captured image to (i) determine a location of an eye of the subject in the captured image relative to the imaging device, (ii) determine an iris-pupil contrast between the iris and the pupil of the subject's eye in the captured image, and (iii) determine a glint intensity of one or more glints present on the subject's eye in the captured image; an illumination efficiency determination module to determine, for each light source of a plurality of light sources of the imaging device, an illumination efficiency based on (i) a distance between the camera and the subject's eye, (ii) a distance between the corresponding light source and the subject's eye, (iii) an incidence angle of the corresponding light source relative to the subject's eye, and (iv) a power profile of the corresponding light source; and a power optimization module to determine an amount of power to supply to each light source to reduce a total cumulative power supplied to the plurality of light sources based on one or more power constraints, wherein each of the power constraints is based on at least one of the iris-pupil contrast, the glint intensity, or the illumination efficiency of one or more of the plurality of light sources.

Example 2 includes the subject matter of Example 1, and wherein to determine the location of the subject's eye relative to the imaging device comprises to determine the three-dimensional location of the subject's eye relative to the imaging device based on the one or more glints present on the subject's eye.

Example 3 includes the subject matter of any of Examples 1 and 2, and wherein to determine the iris-pupil contrast comprises to compare the intensity of an iris region of the subject's eye in the captured image to a pupil region of the subject's eye in the captured image.

Example 4 includes the subject matter of any of Examples 1-3, and wherein the iris-pupil contrast is the difference between (i) an average intensity of pixels of the captured image corresponding to the iris region and (ii) an average intensity of pixels of the captured image corresponding to the pupil region.

Example 5 includes the subject matter of any of Examples 1-4, and wherein to determine the glint intensity comprises to (i) identify a glint region corresponding with a glint of the one or more glints present on the subject's eye and (ii) determine the maximum intensity of pixels of the captured image corresponding to the glint region, wherein the glint intensity is the maximum intensity of the glint region.

Example 6 includes the subject matter of any of Examples 1-5, and wherein to determine the illumination efficiency comprises to determine the distance between the camera and the subject's eye and the distance between the corresponding light source and the subject's eye based on the determined location of the subject's eye relative to the imaging device.

Example 7 includes the subject matter of any of Examples 1-6, and wherein the illumination efficiency determination module is to determine the illumination efficiency based on the expression, $$\frac{C \cdot L(\theta)}{D_{EL}^2 D_{EC}^2},$$

wherein C is a scalar coefficient related to the camera, $\theta$ is the incidence angle of the corresponding light source, L( ) is a normalized power profile of the power profile of the corresponding light source and is dependent on the incidence angle of the corresponding light source, $D_{EL}$ is the distance between the corresponding light source and the subject's eye, and $D_{EC}$ is the distance between the camera and the subject's eye.

Example 8 includes the subject matter of any of Examples 1-7, and wherein to reduce the total cumulative power supplied to the light sources comprises to maintain the power supplied to each light source inclusively between zero and a maximum operating power of the corresponding light source.

Example 9 includes the subject matter of any of Examples 1-8, and wherein to reduce the total cumulative power supplied to the light sources based on one or more power constraints comprises to maintain the iris-pupil contrast at a contrast value not less than a predefined contrast value.

Example 10 includes the subject matter of any of Examples 1-9, and wherein to maintain the iris-pupil contrast at a contrast value not less than the predefined contrast value comprises to maintain an inequality, $$\sum_i T_i \cdot E_i \cdot P_i \geq IPC_0,$$

wherein i is an index of the corresponding light source, $T_i$ is an activation time of the corresponding light source, $E_i$ is the illumination efficiency of the corresponding light source, $P_i$ is the power supplied to the corresponding light source, and $IPC_0$ is the predefined contrast value.

Example 11 includes the subject matter of any of Examples 1-10, and wherein to reduce the total cumulative power of light sources based on one or more power constraints comprises to maintain, for each glint of the one or more glints present on the subject's eye, a glint-eye contrast of the corresponding glint from a corresponding light source at a contrast value not less than a predefined ratio of a sum of intensity of the other light sources.

Example 12 includes the subject matter of any of Examples 1-11, and wherein to maintain the glint-eye contrast of the corresponding glint from the corresponding light source at a contrast value not less than the predefined ratio of the sum of intensity of the other light sources comprises to maintain an inequality, $$SR \cdot T_i \cdot E_i \cdot P_i \geq DR \cdot \sum_j (T_j \cdot E_j \cdot P_j),$$

wherein i is an index of the corresponding light source, j is an index of the plurality of light sources, T is an activation time of the indexed light source, E is the illumination efficiency of the indexed light source, P is the power supplied to the indexed light source, SR is a specular reflection coefficient and DR is a diffusive reflection coefficient.

Example 13 includes the subject matter of any of Examples 1-12, and wherein to reduce the total cumulative power supplied to the light sources based on one or more power constraints comprises to maintain, for each glint of the one or more glints present on the subject's eye, a non-saturated glint intensity.

Example 14 includes the subject matter of any of Examples 1-13, and wherein to maintain the non-saturated glint intensity comprises to maintain an inequality, $T_i - E_i \cdot P_i \leq PRI$, wherein i is an index of the corresponding light source, $T_i$ is an activation time of the corresponding light source, $E_i$ is the illumination efficiency of the corresponding light source, $P_i$ is the power supplied to the corresponding light source, and PRI is a maximum non-saturated pixel intensity.

Example 15 includes the subject matter of any of Examples 1-14, and further comprising a light source power control module to, for each light source, supply the determined amount of power to the corresponding light source.

Example 16 includes a method for power optimization of light sources of an imaging device, the method comprising generating a captured image of a subject; analyzing, by the imaging device, the captured image to (i) determine a location of an eye of the subject in the captured image relative to the imaging device, (ii) determine an iris-pupil contrast between the iris and the pupil of the subject's eye in the captured image, and (iii) determine a glint intensity of one or more glints present on the subject's eye in the captured image; determining, by the imaging device and for each light source of a plurality of light sources of the imaging device, an illumination efficiency based on (i) a distance between the camera and the subject's eye, (ii) a distance between the corresponding light source and the subject's eye, (iii) an incidence angle of the corresponding light source relative to the subject's eye, and (iv) a power profile of the corresponding light source; and determining, by the imaging device, an amount of power to supply to each light source to reduce a total cumulative power supplied to the plurality of light sources based on one or more power constraints, wherein each of the power constraints is based on at least one of the iris-pupil contrast, the glint intensity, or the illumination efficiency of one or more of the plurality of light sources.

Example 17 includes the subject matter of Example 16, and wherein to determine the location of the subject's eye relative to the imaging device comprises to determine the three-dimensional location of the subject's eye relative to the imaging device based on the one or more glints present on the subject's eye.

Example 18 includes the subject matter of any of Examples 16 and 17, and wherein to determine the iris-pupil contrast comprises to compare the intensity of an iris region of the subject's eye in the captured image to a pupil region of the subject's eye in the captured image.

Example 19 includes the subject matter of any of Examples 16-18, and wherein to determine the iris-pupil contrast comprises to determine the difference between (i) an average intensity of pixels of the captured image corresponding to the iris region and (ii) an average intensity of pixels of the captured image corresponding to the pupil region.

Example 20 includes the subject matter of any of Examples 16-19, and wherein to determine the glint intensity comprises to (i) identify a glint region corresponding with a glint of the one or more glints present on the subject's eye and (ii) determine the maximum intensity of pixels of the captured image corresponding to the glint region.

Example 21 includes the subject matter of any of Examples 16-20, and wherein determining the illumination efficiency comprises determining the distance between the camera and the subject's eye and the distance between the corresponding light source and the subject's eye based on the determined location of the subject's eye relative to the imaging device.

Example 22 includes the subject matter of any of Examples 16-21, and wherein determining the illumination efficiency comprises determining the illumination efficiency based on the expression, $$\frac{C \cdot L(\theta)}{D_{EL}^2 D_{EC}^2},$$

wherein C is a scalar coefficient related to the camera, $\theta$ is the incidence angle of the corresponding light source, $L(\ )$ is a normalized power profile of the power profile of the corresponding light source and is dependent on the incidence angle of the corresponding light source, $D_{EL}$ is the distance between the corresponding light source and the subject's eye, and $D_{EC}$ is the distance between the camera and the subject's eye.

Example 23 includes the subject matter of any of Examples 16-22, and wherein to reduce the total cumulative power supplied to the light sources comprises to maintain the power supplied to each light source inclusively between zero and a maximum operating power of the corresponding light source.

Example 24 includes the subject matter of any of Examples 16-23, and wherein to reduce the total cumulative power supplied to the light sources based on one or more power constraints comprises to maintain the iris-pupil contrast at a contrast value not less than a predefined contrast value.

Example 25 includes the subject matter of any of Examples 16-24, and wherein to maintain the iris-pupil contrast at a contrast value not less than the predefined contrast value comprises to maintain an inequality, $$\sum_i T_i \cdot E_i \cdot P_i \geq IPC_0,$$

wherein i is an index of the corresponding light source, $T_i$ is an activation time of the corresponding light source, $E_i$ is the illumination efficiency of the corresponding light source, $P_i$ is the power supplied to the corresponding light source, and $IPC_0$ is the predefined contrast value.

Example 26 includes the subject matter of any of Examples 16-25, and wherein to reduce the total cumulative power supplied to the light sources based on one or more power constraints comprises to maintain, for each glint of the one or more glints present on the subject's eye, a glint-eye contrast of the corresponding glint from a corresponding light source at a contrast value not less than a predefined ratio of a sum of intensity of the other light sources.

Example 27 includes the subject matter of any of Examples 16-26, and wherein to maintain the glint-eye contrast of the corresponding glint from the corresponding light source at a contrast value not less than the predefined ratio of the sum of intensity of the other light sources comprises to maintain an inequality, $$SR \cdot T_i \cdot E_i \cdot P_i \geq DR \cdot \sum_j (T_j \cdot E_j \cdot P_j),$$

wherein i is an index of the corresponding light source, j is an index of the plurality of light sources, T is an activation time of the indexed light source, E is the illumination efficiency of the indexed light source, P is the power supplied to the indexed light source, SR is a specular reflection coefficient and DR is a diffusive reflection coefficient.

Example 28 includes the subject matter of any of Examples 16-27, and wherein to reduce the total cumulative power supplied to the light sources based on one or more power constraints comprises to maintain, for each glint of the one or more glints present on the subject's eye, a non-saturated glint intensity.

Example 29 includes the subject matter of any of Examples 16-28, and wherein to maintain the non-saturated glint intensity comprises to maintain an inequality, $T_i \cdot E_i \cdot P_i \leq PRI$, wherein i is an index of the corresponding light source, $T_i$ is an activation time of the corresponding light source, $E_i$ is the illumination efficiency of the corresponding light source, $P_i$ is the power supplied to the corresponding light source, and PRI is a maximum non-saturated pixel intensity.

Example 30 includes the subject matter of any of Examples 16-29, and further comprising supplying, for each light source, the determined amount of power to the corresponding light source.

Example 31 includes an imaging device comprising a processor; and a memory having stored therein a plurality of instructions that, when executed by the processor, cause the imaging device to perform the method of any of Examples 16-30.

Example 32 includes one or more machine-readable storage media comprising a plurality of instructions stored thereon that, in response to being executed, result in an imaging device performing the method of any of Examples 16-30.

Example 33 includes a computing device for power optimization of light sources, the computing device comprising means for generating a captured image of a subject; means for analyzing the captured image to (i) determine a location of an eye of the subject in the captured image relative to the imaging device, (ii) determine an iris-pupil contrast between the iris and the pupil of the subject's eye in the captured image, and (iii) determine a glint intensity of one or more glints present on the subject's eye in the captured image; means for determining, for each light source of a plurality of light sources of the computing device, an illumination efficiency based on (i) a distance between the camera and the subject's eye, (ii) a distance between the corresponding light source and the subject's eye, (iii) an incidence angle of the corresponding light source relative to the subject's eye, and (iv) a power profile of the corresponding light source; and means for determining an amount of power to supply to each light source to reduce a total cumulative power supplied to the plurality of light sources based on one or more power constraints, wherein each of the power constraints is based on at least one of the iris-pupil contrast, the glint intensity, or the illumination efficiency of one or more of the plurality of light sources.

Example 34 includes the subject matter of Example 33, and wherein the means for analyzing the captured image to determine the location of the subject's eye relative to the imaging device comprises means for determining the three-dimensional location of the subject's eye relative to the imaging device based on the one or more glints present on the subject's eye.

Example 35 includes the subject matter of any of Examples 33 and 34, and wherein the means for analyzing the captured image to determine the iris-pupil contrast comprises means for comparing the intensity of an iris region of the subject's eye in the captured image to a pupil region of the subject's eye in the captured image.

Example 36 includes the subject matter of any of Examples 33-35, and wherein the means for analyzing the captured image to determine the iris-pupil contrast comprises means for determining the difference between (i) an average intensity of pixels of the captured image corresponding to the iris region and (ii) an average intensity of pixels of the captured image corresponding to the pupil region.

Example 37 includes the subject matter of any of Examples 33-36, and wherein the means for analyzing the captured image to determine the glint intensity comprises (i) means for identifying a glint region corresponding with a glint of the one or more glints present on the subject's eye and (ii) means for determining the maximum intensity of pixels of the captured image corresponding to the glint region.

Example 38 includes the subject matter of any of Examples 33-37, and wherein the means for determining the illumination efficiency comprises means for determining the distance between the camera and the subject's eye and the distance between the corresponding light source and the subject's eye based on the determined location of the subject's eye relative to the computing device.

Example 39 includes the subject matter of any of Examples 33-38, and wherein the means for determining the illumination efficiency comprises means for determining the illumination efficiency based on the expression, $$\frac{C \cdot L(\theta)}{D_{EL}^2 D_{EC}^2},$$

wherein C is a scalar coefficient related to the camera, $\theta$ is the incidence angle of the corresponding light source, $L(\ )$ is a normalized power profile of the power profile of the corresponding light source and is dependent on the incidence angle of the corresponding light source, $D_{EL}$ is the distance between the corresponding light source and the subject's eye, and $D_{EC}$ is the distance between the camera and the subject's eye.

Example 40 includes the subject matter of any of Examples 33-39, and wherein the means for determining an amount of power to supply to each light source to reduce the total cumulative power supplied to the light sources comprises means for maintaining the power supplied to each light source inclusively between zero and a maximum operating power of the corresponding light source.

Example 41 includes the subject matter of any of Examples 33-40, and wherein the means for determining an amount of power to supply to each light source to reduce the total cumulative power supplied to the light sources based on one or more power constraints comprises means for maintaining the iris-pupil contrast at a contrast value not less than a predefined contrast value.

Example 42 includes the subject matter of any of Examples 33-41, and wherein the means for maintaining the iris-pupil contrast at a contrast value not less than the predefined contrast value comprises means for maintaining an inequality, $$\sum_i T_i \cdot E_i \cdot P_i \geq IPC_0,$$

wherein i is an index of the corresponding light source, $T_i$ is an activation time of the corresponding light source, $E_i$ is the illumination efficiency of the corresponding light source, $P_i$ is the power supplied to the corresponding light source, and $IPC_0$ is the predefined contrast value.

Example 43 includes the subject matter of any of Examples 33-42, and wherein the means for determining an amount of power to supply to each light source to reduce the total cumulative power supplied to the light sources based on one or more power constraints comprises means for maintaining, for each glint of the one or more glints present on the subject's eye, a glint-eye contrast of the corresponding glint from a corresponding light source at a contrast value not less than a predefined ratio of a sum of intensity of the other light sources.

Example 44 includes the subject matter of any of Examples 33-43, and wherein the means for maintaining the glint-eye contrast of the corresponding glint from the corresponding light source at a contrast value not less than the predefined ratio of the sum of intensity of the other light sources comprises means for maintaining an inequality, $$SR \cdot T_i \cdot E_i \cdot P_i \geq DR \cdot \sum_j (T_j \cdot E_j \cdot P_j),$$

wherein i is an index of the corresponding light source, j is an index of the plurality of light sources, T is an activation time of the indexed light source, E is the illumination efficiency of the indexed light source, P is the power supplied to the indexed light source, SR is a specular reflection coefficient and DR is a diffusive reflection coefficient.

Example 45 includes the subject matter of any of Examples 33-44, and wherein the means for determining an amount of power to supply to each light source to reduce the total cumulative power supplied to the light sources based on one or more power constraints comprises means for maintaining, for each glint of the one or more glints present on the subject's eye, a non-saturated glint intensity.

Example 46 includes the subject matter of any of Examples 33-45, and wherein the means for maintaining the non-saturated glint intensity comprises means for maintaining an inequality, $T_i \cdot E_i \cdot P_i \leq PRI$, wherein i is an index of the corresponding light source, $T_i$ is an activation time of the corresponding light source, $E_i$ is the illumination efficiency of the corresponding light source, $P_i$ is the power supplied to the corresponding light source, and PRI is a maximum non-saturated pixel intensity.

Example 47 includes the subject matter of any of Examples 33-46, and further comprising means for supplying, for each light source, the determined amount of power to the corresponding light source.

The invention claimed is:

1. An imaging device for power optimization of light sources of the imaging device, the imaging device comprising:
   a camera to generate a captured image of a subject;
   a processor; and
   a memory having stored therein a plurality of instructions that, when executed by the processor, cause the processor to:
      analyze the captured image to (i) determine a location of an eye of the subject in the captured image relative to the imaging device, (ii) determine an iris-pupil contrast between the iris and the pupil of the subject's eye in the captured image, and (iii) determine a glint intensity of one or more glints present on the subject's eye in the captured image;
      determine, for each light source of a plurality of light sources of the imaging device, an illumination efficiency based on (i) a distance between the camera and the subject's eye, (ii) a distance between the corresponding light source and the subject's eye, (iii) an incidence angle of the corresponding light source relative to the subject's eye, and (iv) a power profile of the corresponding light source; and
      determine an amount of power to supply to each light source to maintain the iris-pupil contrast at a contrast value not less than the predefined contrast value comprises to maintain an inequality, $$\sum_i T_i \cdot E_i \cdot P_i \geq IPC_0,$$

wherein i is an index of the corresponding light source, $T_i$ is an activation time of the corresponding light source, $E_i$ is the illumination efficiency of the corresponding light source, $P_i$ is the power supplied to the corresponding light source, and $IPC_0$ is the predefined contrast value.

2. The imaging device of claim 1, wherein to determine the location of the subject's eye relative to the imaging device comprises to determine a three-dimensional location of the subject's eye relative to the imaging device based on the one or more glints present on the subject's eye.

3. The imaging device of claim 1, wherein to determine the iris-pupil contrast comprises to compare an intensity of an iris region of the subject's eye in the captured image to a pupil region of the subject's eye in the captured image.

4. The imaging device of claim 3, wherein the iris-pupil contrast is a difference between (i) an average intensity of pixels of the captured image corresponding to the iris region and (ii) an average intensity of pixels of the captured image corresponding to the pupil region.

5. The imaging device of claim 1, wherein to determine the glint intensity comprises to (i) identify a glint region corresponding with a glint of the one or more glints present on the subject's eye and (ii) determine a maximum intensity of pixels of the captured image corresponding to the glint region,
   wherein the glint intensity is the maximum intensity of the glint region.

6. The imaging device of claim 1, wherein to determine the illumination efficiency comprises to determine the distance between the camera and the subject's eye and the distance between the corresponding light source and the subject's eye based on the determined location of the subject's eye relative to the imaging device.

7. The imaging device of claim 1, wherein to determine the illumination efficiency comprises to determine the illumination efficiency based on the expression, $$\frac{C \cdot L(\theta)}{D_{EL}^2 D_{EC}^2},$$

wherein C is a scalar coefficient related to the camera, $\theta$ is the incidence angle of the corresponding light source, $L(\ )$ is a normalized power profile of the power profile of the corresponding light source and is dependent on the incidence angle of the corresponding light source, $D_{EL}$ is the distance between the corresponding light source and the subject's eye, and $D_{EC}$ is the distance between the camera and the subject's eye.

8. The imaging device of claim 1, wherein to determine the amount of power to supply to each light source further comprises to determine an amount of power to supply to each light source to maintain the power supplied to each light source inclusively between zero and a maximum operating power of the corresponding light source.

9. The imaging device of claim 1, wherein to determine the amount of power to supply to each light source further comprises to determine an amount of power to supply to each light source to maintain, for each glint of the one or more glints present on the subject's eye, a glint-eye contrast of the corresponding glint from a corresponding light source at a contrast value not less than a predefined ratio of the intensity of the corresponding light source and a sum of intensity of the other light sources of the plurality of light sources.

10. The imaging device of claim 9, wherein to maintain the glint-eye contrast of the corresponding glint from the corresponding light source at a contrast value not less than the predefined ratio of the sum of intensity of the other light sources comprises to maintain an inequality, $$SR \cdot T_i \cdot E_i \cdot P_i \geq DR \cdot \sum_j (T_j \cdot E_j \cdot P_j),$$

wherein i is an index of the corresponding light source, j is an index of the plurality of light sources, T is an activation time of the indexed light source, E is the illumination efficiency of the indexed light source, P is the power supplied to the indexed light source, SR is a specular reflection coefficient and DR is a diffusive reflection coefficient.

11. The imaging device of claim 1, wherein to determine the amount of power to supply to each light source further comprises to determine an amount of power to supply to each light source to maintain, for each glint of the one or more glints present on the subject's eye, a non-saturated glint intensity.

12. The imaging device of claim 11, wherein to maintain the non-saturated glint intensity comprises to maintain an inequality, $T_i \cdot E_i \cdot P_i \leq PRI$, wherein i is an index of the corresponding light source, $T_i$ is an activation time of the corresponding light source, $E_i$ is the illumination efficiency of the corresponding light source, $P_i$ is the power supplied to the corresponding light source, and PRI is a maximum non-saturated pixel intensity.

13. One or more non-transitory machine-readable storage media comprising a plurality of instructions stored thereon that, in response to execution, cause a computing device to:

generate a captured image of a subject;

analyze the captured image to (i) determine a location of an eye of the subject in the captured image relative to the computing device, (ii) determine an iris-pupil contrast between the iris and the pupil of the subject's eye in the captured image, and (iii) determine a glint intensity of one or more glints present on the subject's eye in the captured image;

determine, for each light source of a plurality of light sources of the computing device, an illumination efficiency based on (i) a distance between the camera and the subject's eye, (ii) a distance between the corresponding light source and the subject's eye, (iii) an incidence angle of the corresponding light source relative to the subject's eye, and (iv) a power profile of the corresponding light source; and determine an amount of power to supply to each light source to maintain the iris-pupil contrast at a contrast value not less than a predefined contrast value by maintaining an inequality, $$\sum_i T_i \cdot E_i \cdot P_i \geq IPC_0,$$

wherein i is an index of the corresponding light source, $T_i$ is an activation time of the corresponding light source, $E_i$ is the illumination efficiency of the corresponding light source, $P_i$ is the power supplied to the corresponding light source, and $IPC_0$ is the predefined contrast value.

14. The one or more non-transitory machine-readable storage media of claim 13, wherein to determine the location of the subject's eye relative to the computing device comprises to determine the three-dimensional location of the subject's eye relative to the computing device based on the one or more glints present on the subject's eye.

15. The one or more non-transitory machine-readable storage media of claim 13, wherein to determine the iris-pupil contrast comprises to determine the difference between (i) an average intensity of pixels of the captured image corresponding to an iris region of the subject's eye in the captured image and (ii) an average intensity of pixels of the captured image corresponding to a pupil region of the subject's eye in the captured image.

16. The one or more non-transitory machine-readable storage media of claim 13, wherein to determine the glint intensity comprises to (i) identify a glint region corresponding with a glint of the one or more glints present on the subject's eye and (ii) determine the maximum intensity of pixels of the captured image corresponding to the glint region.

17. The one or more non-transitory machine-readable storage media of claim 13, wherein to determine the illumination efficiency comprises to determine the illumination efficiency based on the expression, $$\frac{C \cdot L(\theta)}{D_{EL}^2 D_{EC}^2},$$

wherein C is a scalar coefficient related to the camera, $\theta$ is the incidence angle of the corresponding light source, L( ) is a normalized power profile of the power profile of the corresponding light source and is dependent on the incidence angle of the corresponding light source, $D_{EL}$ is the distance between the corresponding light source and the subject's eye, and $D_{EC}$ is the distance between the camera and the subject's eye.

18. The one or more non-transitory machine-readable storage media of claim 13, wherein to determine the amount of power to supply to each light source further comprises to determine an amount of power to supply to each light source to maintain, for each glint of the one or more glints present on the subject's eye, a glint-eye contrast of the corresponding glint from a corresponding light source at a contrast value not less than a predefined ratio of a sum of intensity of the other light sources by maintaining an inequality, $$SR \cdot T_i \cdot E_i \cdot P_i \geq DR \cdot \sum_j (T_j \cdot E_j \cdot P_j),$$

wherein i is an index of the corresponding light source, j is an index of the plurality of light sources, T is an activation time of the indexed light source, E is the illumination efficiency of the indexed light source, P is the power supplied to the indexed light source, SR is a specular reflection coefficient and DR is a diffusive reflection coefficient.

19. The one or more non-transitory machine-readable storage media of claim 13, wherein to determine the amount of power to supply to each light source further comprises to determine an amount of power to supply to each light source to maintain, for each glint of the one or more glints present on the subject's eye, a non-saturated glint intensity by maintaining an inequality, $T_i \cdot E_i \cdot P_i \leq PRI$, wherein i is an index of the corresponding light source, $T_i$ is an activation time of the corresponding light source, $E_i$ is the illumination efficiency of the corresponding light source, $P_i$ is the power supplied to the corresponding light source, and PRI is a maximum non-saturated pixel intensity.

20. A method for power optimization of light sources of an imaging device, the method comprising:

generating a captured image of a subject;

analyzing, by the imaging device, the captured image to (i) determine a location of an eye of the subject in the captured image relative to the imaging device, (ii) determine an iris-pupil contrast between the iris and the pupil of the subject's eye in the captured image, and (iii) determine a glint intensity of one or more glints present on the subject's eye in the captured image;

determining, by the imaging device and for each light source of a plurality of light sources of the imaging device, an illumination efficiency based on (i) a distance between the camera and the subject's eye, (ii) a distance between the corresponding light source and the subject's eye, (iii) an incidence angle of the corresponding light source relative to the subject's eye, and (iv) a power profile of the corresponding light source; and determining, by the imaging device, an amount of power to supply to each light source to maintain the iris-pupil contrast at a contrast value not less than a predefined contrast value by maintaining an inequality, $$\sum_i T_i \cdot E_i \cdot P_i \geq IPC_0,$$

wherein i is an index of the corresponding light source, $T_i$ is an activation time of the corresponding light source, $E_i$ is the illumination efficiency of the corresponding light source, $P_i$ is the power supplied to the corresponding light source, and $IPC_0$ is the predefined contrast value.

21. The method of claim 20, wherein to determine the amount of power to supply to each light source further comprises to determine an amount of power to supply to each light source to:

maintain the power supplied to each light source inclusively between zero and a maximum operating power of the corresponding light source;

maintain the iris-pupil contrast at a contrast value not less than a predefined contrast value;

maintain, for each glint of the one or more glints present on the subject's eye, a glint-eye contrast of the corresponding glint from a corresponding light source at a contrast value not less than a predefined ratio of a sum of intensity of the other light sources; and maintain, for each glint of the one or more glints present on the subject's eye, a non-saturated glint intensity.

22. The method of claim 20, further comprising supplying, for each light source, the determined amount of power to the corresponding light source.

* * * * *